(12) United States Patent
Yi

(10) Patent No.: US 6,561,320 B2
(45) Date of Patent: May 13, 2003

(54) AUTOMATICALLY OPERATED ANTISKID APPARATUS FOR AUTOMOBILE TIRES

(75) Inventor: Ju-Young Yi, Yurim Industrial, 446-3, Sangyeon-Dong, Dongducheon-Si, Kyunggi-Do (KR)

(73) Assignee: Ju-Young Yi, Kyunggi-Do (KR)

( * ) Notice: Subject to any disclaimer, the term of this patent is extended or adjusted under 35 U.S.C. 154(b) by 14 days.

(21) Appl. No.: 09/893,727

(22) Filed: Jun. 29, 2001

(65) Prior Publication Data

US 2002/0021046 A1 Feb. 21, 2002

(30) Foreign Application Priority Data

Aug. 8, 2000 (KR) ......................................... 2000-45784
Jan. 30, 2001 (KR) ........................................... 2001-4247

(51) Int. Cl.[7] ............................. B60J 1/14; B60C 11/00
(52) U.S. Cl. ........................ 188/5; 152/225 R; 152/226
(58) Field of Search ................................ 188/4 R, 5, 6; 152/208, 209.1, 210, 218, 222, 223, 225 R, 226, 227, 228; 301/44

(56) References Cited

U.S. PATENT DOCUMENTS

| | | | | |
|---|---|---|---|---|
| 4,909,576 A | * | 3/1990 | Zampieri | 301/44 T |
| 5,088,534 A | * | 2/1992 | Engel | 152/208 |
| 5,147,479 A | * | 9/1992 | Koshi et al. | 152/216 |

* cited by examiner

Primary Examiner—Christopher P. Schwartz
(74) Attorney, Agent, or Firm—Arent Fox Kintner Plotkin & Kahn

(57) ABSTRACT

Disclosed herein is an automatically operated antiskid apparatus for automobile tires. The automatically operated antiskid apparatus includes an operating signal generating unit for transmitting an operating signal generated by a bar operating switch to positions in the vicinity of automotive wheels. A signal transmitting unit receives the operating signal from the operating signal generating unit and transmits the operating signal from a stationary automobile body to rotating wheel rims. An antiskid bar and antiskid bar operating unit receives the operating signal from the signal transmitting unit and operates antiskid bars embedded in tread portions of the tires.

3 Claims, 14 Drawing Sheets

AUTOMATICALLY OPERATED ANTISKID APPARATUS FOR AUTOMOBILE TIRES

BACKGROUND OF THE INVENTION

1. Field of the Invention

The present invention relates generally to automatically operated antiskid apparatus for automobile tires, and more particularly to automatically operated antiskid apparatus for automobile tires, which is capable of projecting antiskid bars from the circumferential surfaces of automobile tires by manipulating a bar operating switch from the interior of an automobile so as to drive the automobile on a snowy or icy road.

2. Description of the Prior Art

In present-day life, automobiles are indispensably utilized for obtaining satisfactory mobility, and a demand for automobiles is continuously increasing. The safety of a driver greatly depends on weather conditions and external environments while he drives an automobile. In general, when an automobile is started, driven and braked on a snowy or icy road, antiskid apparatuses for automobile tires, such as tire chains, are utilized so as to prevent the automobile tires from skidding on such a road.

That is, in the winter season, in order to provide for snowy weather and a snowy or icy road, drivers put tire chains made of steel around automobile tires, clamp them together, and tighten them using rubber strings before or while driving.

In order to eliminate inconvenience caused by the conventional tire chains that should be put around tires, clamped together and tightened by drivers, there are developed and merchandised improved antiskid apparatuses that are easily operated and lightweight.

However, the conventional improved antiskid apparatuses are problematic, in that the antiskid apparatuses should be mounted on automobile tires and demounted from the tires by drivers' physical effort, it is difficult to mount antiskid apparatuses on automobile tires in advance so as to provide against snowy or icy areas that are occasionally met, and unskilled drivers should spend excessive time in mounting the antiskid apparatuses on the automobile tires and demounting the antiskid apparatuses from the automobile tires.

SUMMARY OF THE INVENTION

Accordingly, the present invention has been made keeping in mind the above problems occurring in the prior art, and an object of the present invention is to provide an automatically operated antiskid apparatus for automobile tires, which is capable of selectively projecting antiskid bars from the circumferential surfaces of the automobile tires and retracting the antiskid bars into the tires by manipulating a bar mounting switch at a driver's seat so as to drive the automobile on a snowy or icy road and a dry road.

In order to accomplish the above object, the present invention provides an automatically operated antiskid apparatus for automobile tires, comprising: an operating signal generating unit for transmitting an operating signal generated by a bar operating switch to positions in the vicinity of automotive wheels; a signal transmitting unit for receiving the operating signal from the operating signal generating unit and transmitting the operating signal from a stationary automobile body to rotating wheel rims; and an antiskid bar and antiskid bar operating unit for receiving the operating signal from the signal transmitting unit and operating antiskid bars embedded in tread portions of the tires.

In accordance with a first embodiment of the present invention, the signal generating unit consists of the bar operating switch, a booster connected to the bar operating switch for amplifying the operating signal, a hydraulic cylinder connected to the booster for transmitting an amplified operating signal, a hydraulic conduit connected to the hydraulic cylinder for transmitting the amplified operating signal, and a plurality of hydraulic pistons connected to the hydraulic conduit and mounted on knuckles situated in the middle of the tires; the signal transmitting unit consists of a plurality of divided bearings each attached to a plurality of guide portions formed on inside surfaces of wheel rims, each of the divided bearings being composed of left and right disks and bearing balls between right and left disks; the antiskid bar and antiskid bar operating unit consists of a plurality of steel wire pulling pieces each situated outside of each divided bearing, a plurality of steel wires first ends of which are connected to the steel wire pulling pieces, and a plurality of antiskid bar units connected to second ends of the steel wires and positioned in tread portions of the tires; and each of the antiskid bar units consists of a T-shaped, hollow casing part made of flexible, thin material and provided with a plurality of vertical guide slots, a guide part provided with a plurality of inclined guide slots and at its both sides with one or more springs, and a bar part provided with a plurality of projections and situated between two members of the guide part with the projections inserted into the inclined slots of the guide part.

In accordance with a second embodiment of the present invention, the signal generating unit consists of the bar operating switch, and a plurality of electric wires first ends of which are connected to the bar operating switch and second ends of which are connected to the hubs, each of the electric wires being comprised of a pair of wire strands; the signal transmitting unit consists of a plurality of divided bearings, each of the divided bearings being comprised of inside and outside bearings and a plurality of balls, the inside bearing being mounted on a hub and provided with two contacts each surrounded with intercepting material, the outside bearing being mounted not to be rotated, first central terminals of the wire strands of each electric wire passing through the outside bearing and being brought into contact with the contacts formed on the inside bearing, second central terminals of the wire strands of each electric wire passing through the inside bearing and the intercepting material and being connected to the contacts formed on the inside bearing; the antiskid bar and antiskid bar operating unit in which second ends of the electric wires are connected to electromagnets positioned in the casing parts of a plurality of electromagnetic antiskid bar units so that guide parts are moved to project bar parts by moving permanent magnets attached to the side protrusions of the guide parts; and each of the electromagnetic type antiskid bar units consists of the T-shaped, hollow casing part made of flexible, thin material and provided in its interior with four fixed electromagnets and a plurality of vertical guide slots, the guide part provided with a plurality of inclined guide slots and at its both sides with two permanent magnets, and the bar part provided with a plurality of projections and situated between two members of the guide part with the projections inserted into the inclined slots of the guide part.

In accordance with a third embodiment of the present invention, the signal generating unit consists of the block operating switch, and a plurality of electric wires first ends of each of which are connected to the block operating switch and second ends of each of which are connected to a hub, each of the electric wires being comprised of a pair of wire strands; the signal transmitting unit consists of a plurality of divided bearings, each of the divided bearings being comprised of inside and outside bearings and a plurality of balls, the inside bearing being mounted on a hub and provided with two contacts each surrounded with intercepting material, the outside bearing being mounted not to be rotated, first central terminals of the wire strands of each electric wire passing through the outside bearing and being brought into contact with the contacts formed on the inside bearing, second central terminals of the wire strands passing through the inside bearing and the intercepting material and being connected to the contacts formed on the inside bearing; the antiskid block and antiskid block operating unit in which the second ends of the electric wires are connected to coils positioned in the casing parts of electromagnetic type circular antiskid block units embedded in the tread portions of tires so that the guide parts are moved to project block parts by moving permanent magnets attached to side protrusions of the guide part: and each of the electromagnetic circular antiskid block units consists of the cylindrical casing part which is made of rubber and in which a coil, to which the wire is connected, is situated, the cylindrical guide part positioned inside of the casing part and provided with a plurality of inclined guide slots, and the block part positioned inside of the guide part and provided at its outside surface with a plurality of projections inserted into the guide slots.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
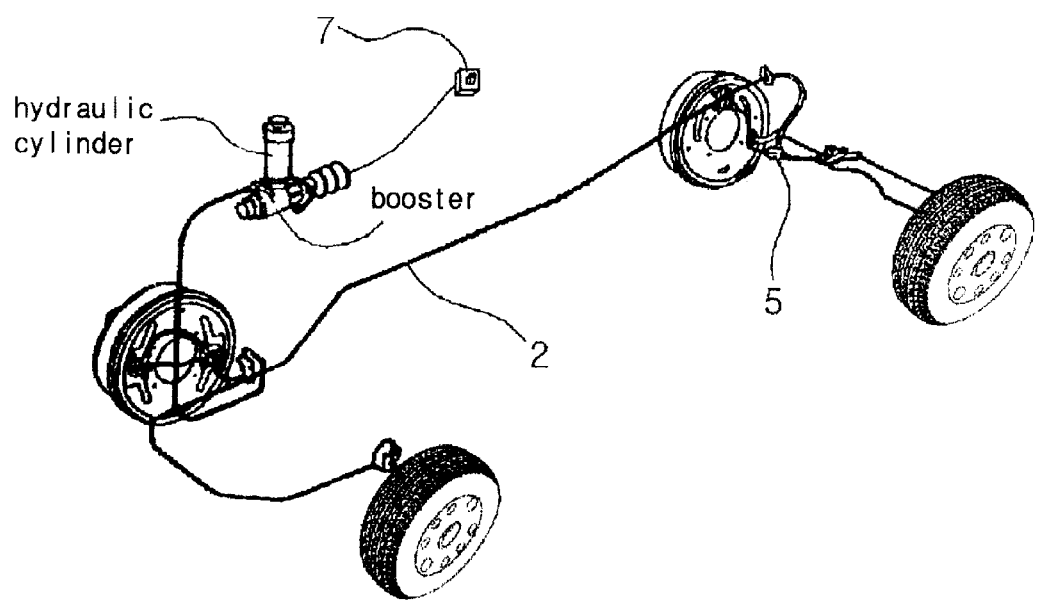
FIG. 1 is a perspective view showing an operating signal generating unit of an automatically operated antiskid apparatus for automobile tires in accordance with the present invention.

Reference now should be made to the drawings, in which the same reference numerals are used throughout the different drawings to designate the same or similar components.

FIG. 1 is a perspective view showing an operating signal generating unit of an automatically operated antiskid apparatus for automobile tires in accordance with the present invention. In this drawing, when a driver manipulates a bar operating switch 7 situated in the vicinity of a driver's seat, an operating signal is transmitted to a booster so that a hydraulic cylinder supplies hydraulic oil through a hydraulic conduit 2, thus supplying hydraulic oil toward the wheel rims.

Figure 2:
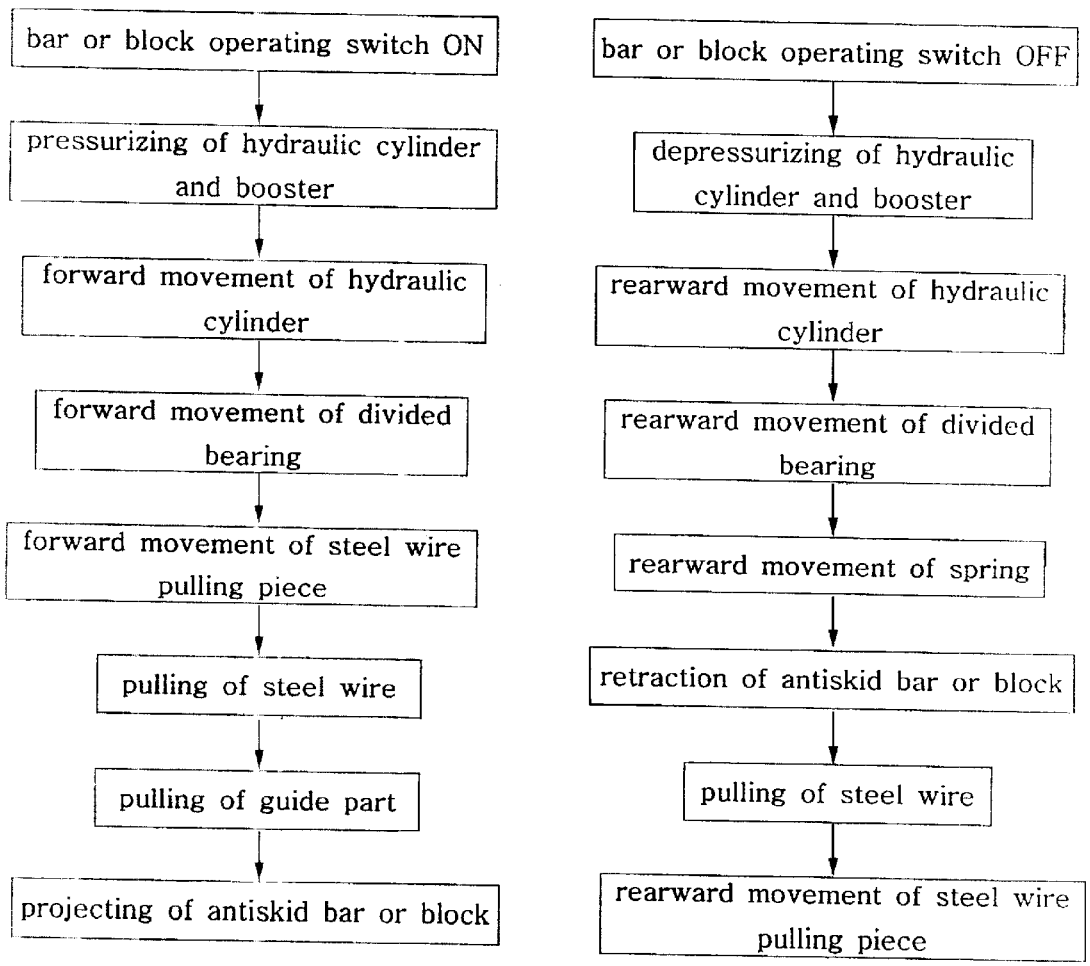
FIG. 2 is a flowchart showing the operation of the automatically operated antiskid apparatus for automobile tires.

FIG. 2 is a flowchart showing the operation of the automatically operated antiskid apparatus for automobile tires. In this flowchart, the operation of the operating signal generating unit, a signal transmitting unit and an antiskid bar and antiskid bar operating unit are described in sequence.

Figure 3:
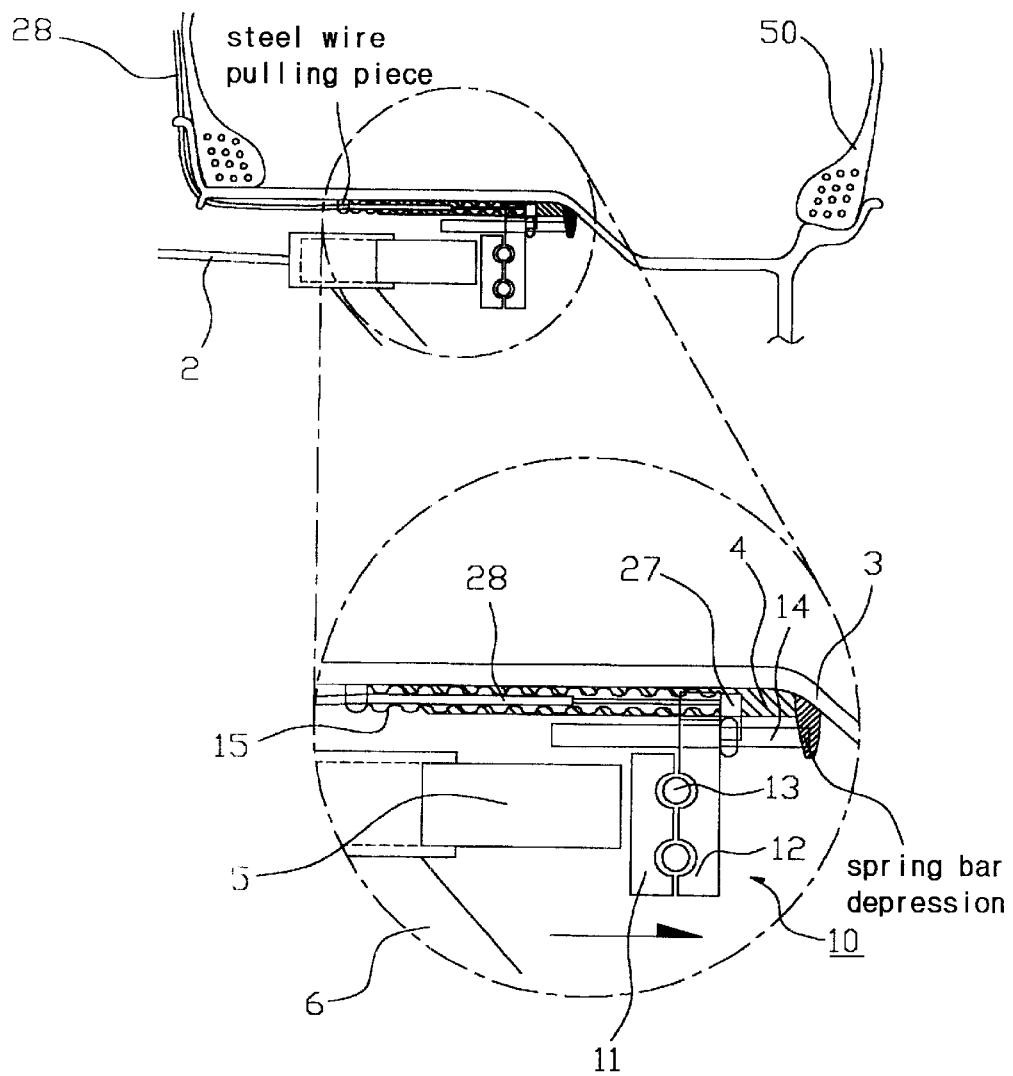
FIG. 3 is a partial sectional view showing the operation of an automatically operated antiskid apparatus of a first embodiment in which a hydraulic piston pushes a divided bearing.

FIG. 3 is a partial sectional view showing the operation of an automatically operated antiskid apparatus of a first embodiment in which a hydraulic piston 5 pushes a divided bearing 10. The divided bearing 10 and a steel wire pulling piece 27 are pushed to the right by the forward movement of the hydraulic piston 5. In this drawing, a connection between the steel wire pulling piece 27 and the steel wire 28 is covered with a bellows tube 15 so as to prevent the connection from being polluted by pollutants, such as dust.

Figure 4:
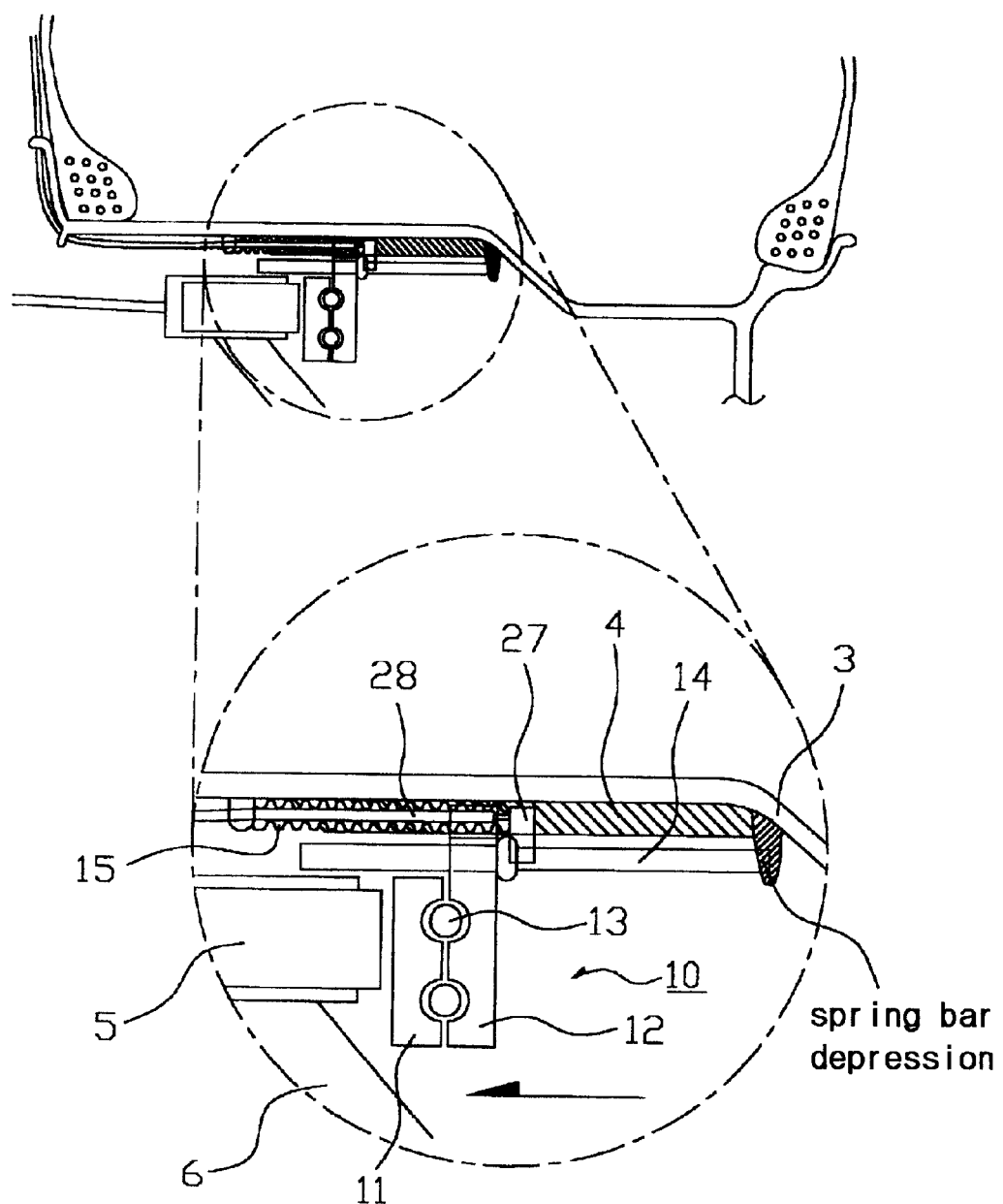
FIG. 4 is a partial sectional view showing the operation of the automatically operated antiskid apparatus of the first embodiment in which the hydraulic piston is moved rearward and the divided bearing is returned to its original position by the action of spring bars.

FIG. 4 is a partial sectional view showing the operation of the automatically operated antiskid apparatus of the first embodiment in which the hydraulic piston is moved rearward and the divided bearing is returned to its original position by the action of spring bars 14. In this drawing, if a driver manipulates the bar operating switch 7 when antiskid bars are not desired to be utilized, the hydraulic piston 5 is moved rearward and the divided bearing 10 is returned to its original position by the action of two spring bars 14. In this case, the steel wire pulling piece 27 is returned to its original position by the action of the spring 24 of an antiskid bar unit 20.

Figure 5:
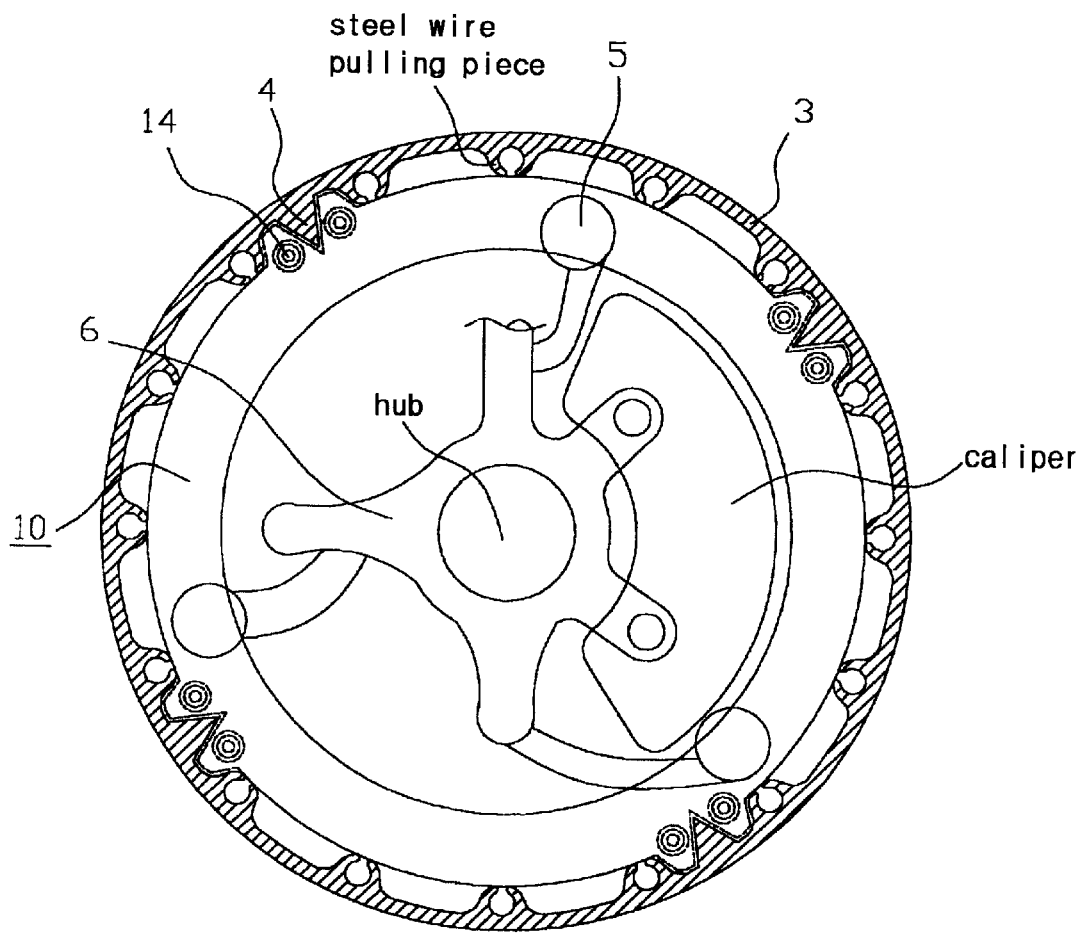
FIG. 5 is a partial sectional view showing the automatically operated antiskid apparatus of the first embodiment in which a plurality of hydraulic pistons and the divided bearing are arranged on a wheel rim.

FIG. 5 is a partial sectional view showing the automatically operated antiskid apparatus of the first embodiment in which a plurality of hydraulic pistons 5 and the divided bearing 10 are arranged on a wheel rim. In this drawing, the divided bearing 10 is fixedly held by a plurality of guide portions 4 formed on the inside surfaces of wheel rims and a plurality of hydraulic pistons 5 are arranged at regular intervals.

Figure 6:
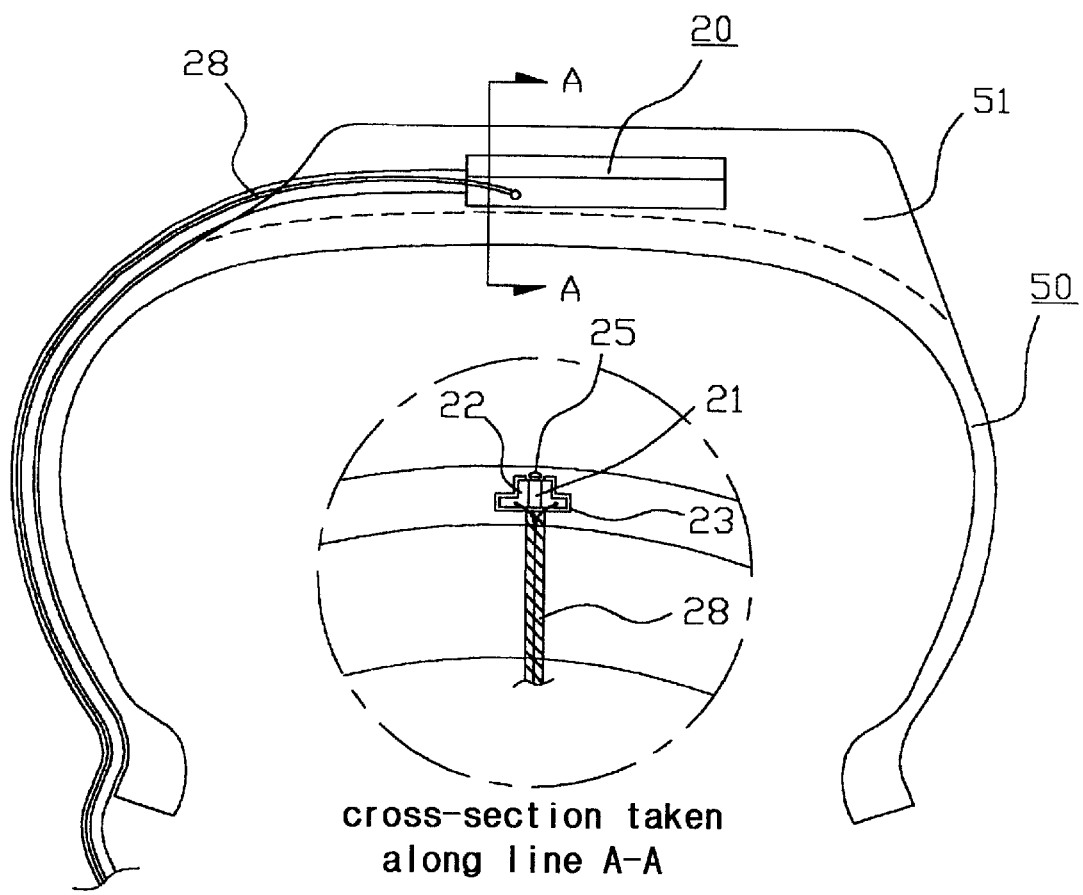
FIG. 6 is a sectional view showing the automatically operated antiskid apparatus of the first embodiment in which the antiskid bar unit embedded in the tread portion of a tire is connected to the steel wire.

FIG. 6 is a sectional view showing the automatically operated antiskid apparatus of the first embodiment in which the antiskid bar unit 20 embedded in the tread portion of a tire is connected to the steel wire 28. In this drawing, the connection of the antiskid bar unit 20 and the steel wire 28 is illustrated in detail.

Figure 7:
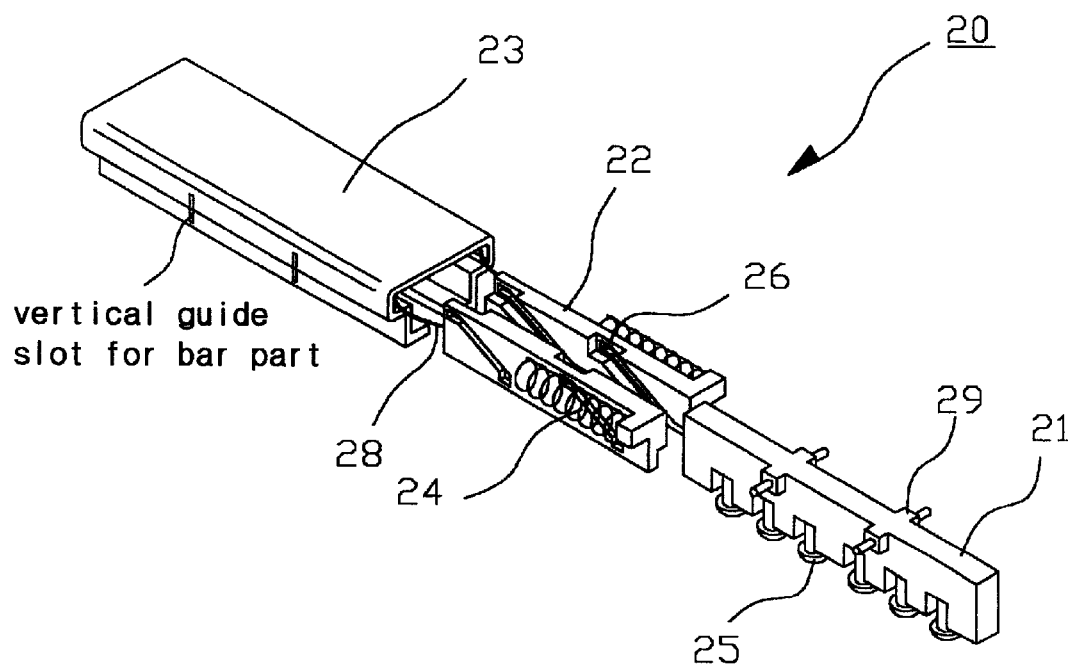
FIG. 7 is a perspective view showing the assembly of an antiskid bar unit of the first embodiment in which a divided guide part and a bar part are inserted into a hollow, T-shaped casing part.

FIG. 7 is a perspective view showing the assembly of the antiskid bar unit of the first embodiment in which a divided guide part 22 and a bar part 21 are inserted into a hollow, T-shaped casing part 23.

Figure 8:
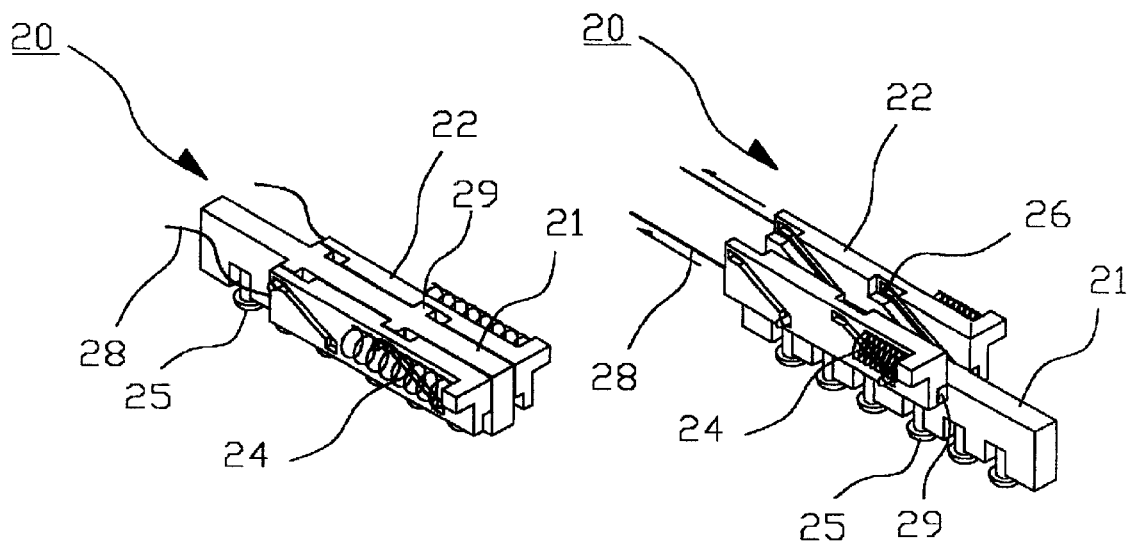
FIG. 8 is a perspective view showing the operation of the antiskid bar unit of the first embodiment in which projections formed on the bar part are moved along inclined guide slots formed through the guide part while the projections are inserted into the inclined guide slots.

FIG. 8 is a perspective view showing the operation of the antiskid bar unit of the first embodiment in which projections 29 formed on the bar part 21 are moved along inclined guide slots 26 formed through the guide part 22 while the projections 29 are inserted into the inclined guide slots 26.

Figure 9:
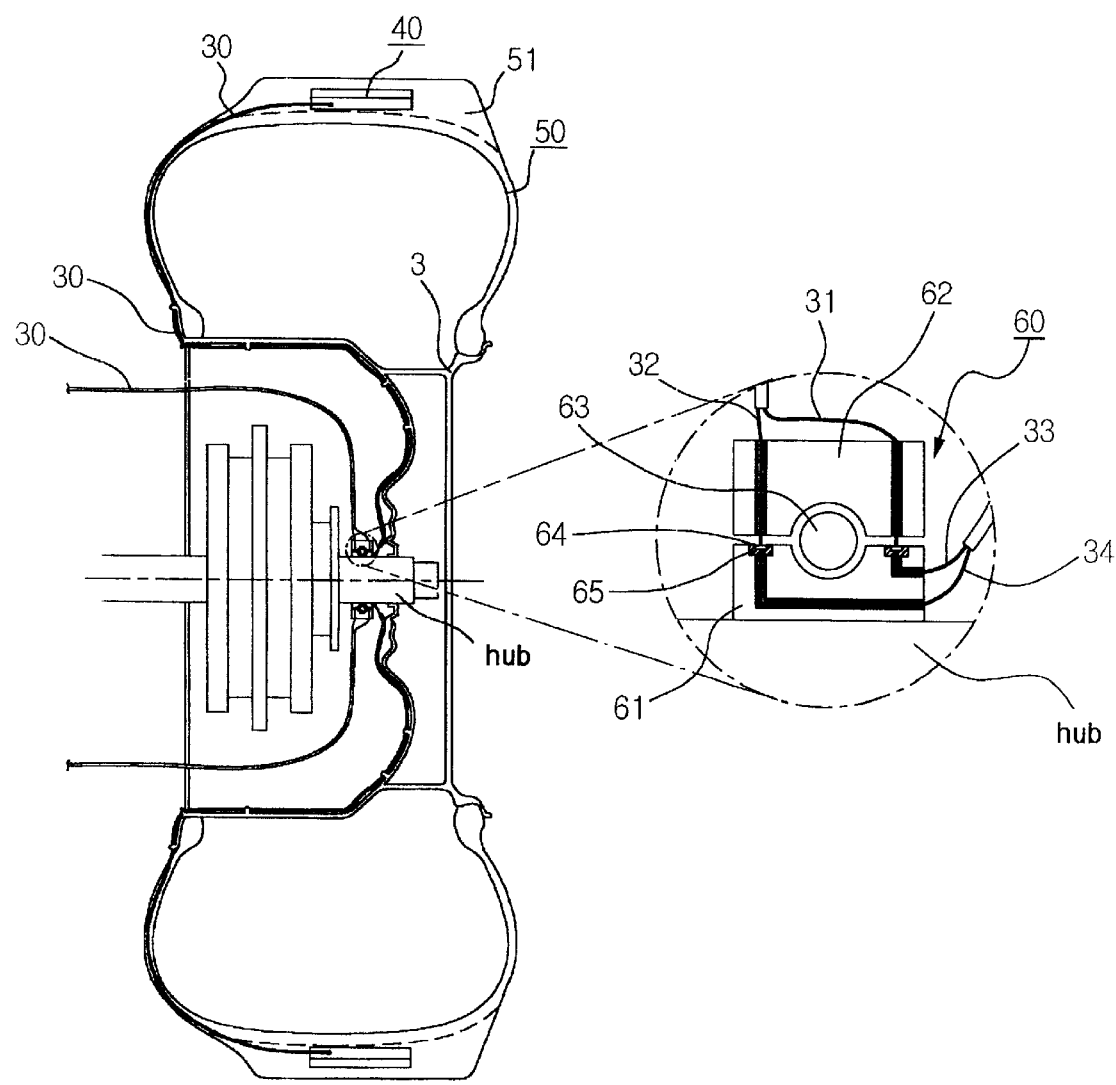
FIG. 9 is a partial sectional view showing an automatically operated antiskid apparatus of a second embodiment, in which electric wires are connected to a divided bearing.

FIG. 9 is a partial sectional view showing an automatically operated antiskid apparatus of a second embodiment, in which electric wires are connected to a divided bearing. In this drawing, in order to connect electric wires from a stationary automobile body to rotated hubs, the first central terminals 31 and 32 of the wire strands of each wire pass through an outside bearing 61 and are brought into contact with contacts 64 formed on an inside bearing 61, while the second central terminals 33 and 34 of the wire strands of each wire pass through the inside bearing 61 and intercepting material 65 and are connected to the contacts 64 formed on the inside bearing 61.

Figure 10:
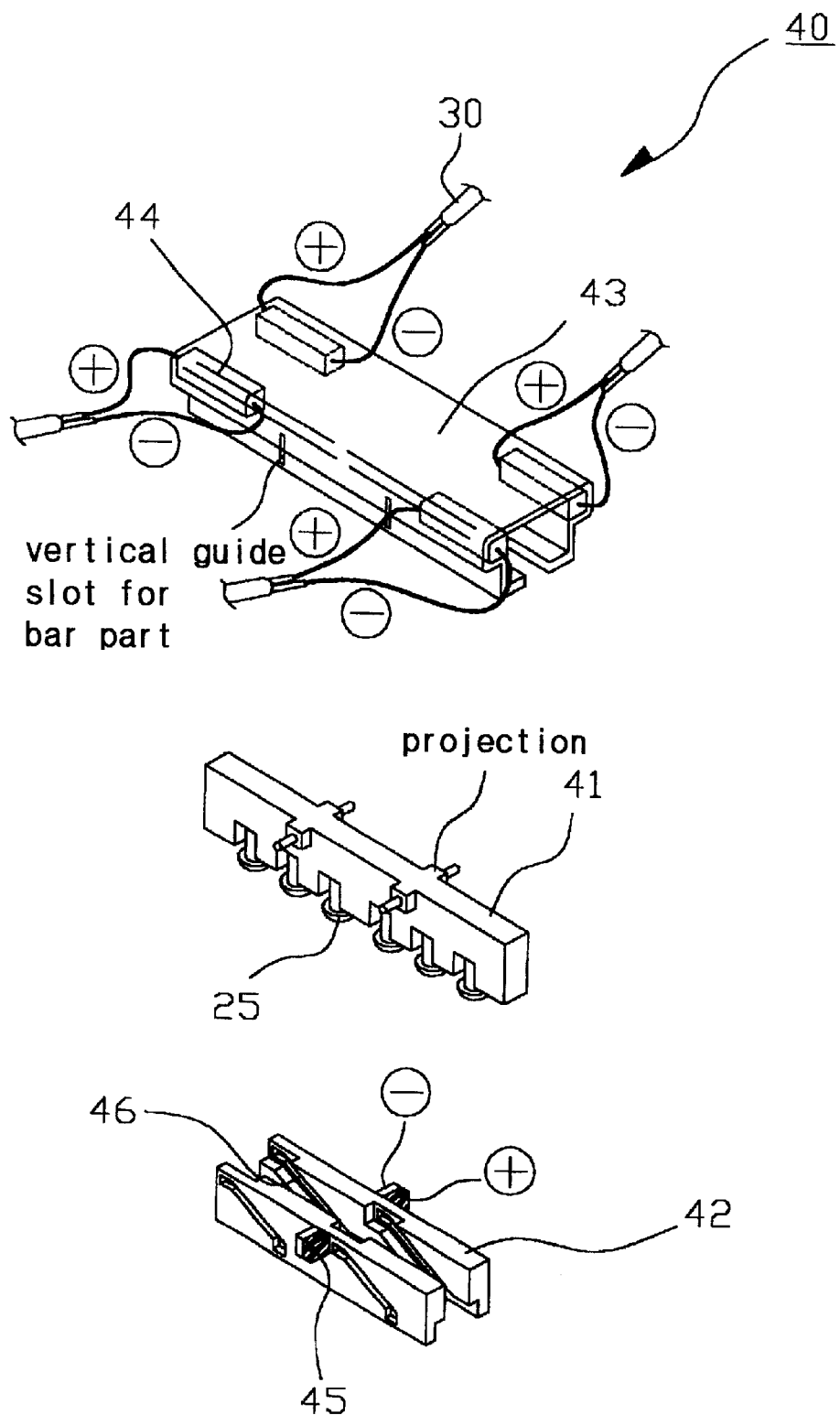
FIG. 10 is an exploded perspective view showing the electromagnetic type antiskid bar unit of the automatically operated antiskid apparatus of the second embodiment.

FIG. 10 is an exploded perspective view showing the electromagnetic type antiskid bar unit of the automatically operated antiskid apparatus of the second embodiment. In this drawing, electric wires 30 are connected to electromagnets 44 inserted into the casing part 43 of the electromagnet type bar supply unit 40 embedded in the tread portions 51 of the tires and permanent magnets 45 are formed on the side protrusions of a divided guide part 42.

Figure 11:
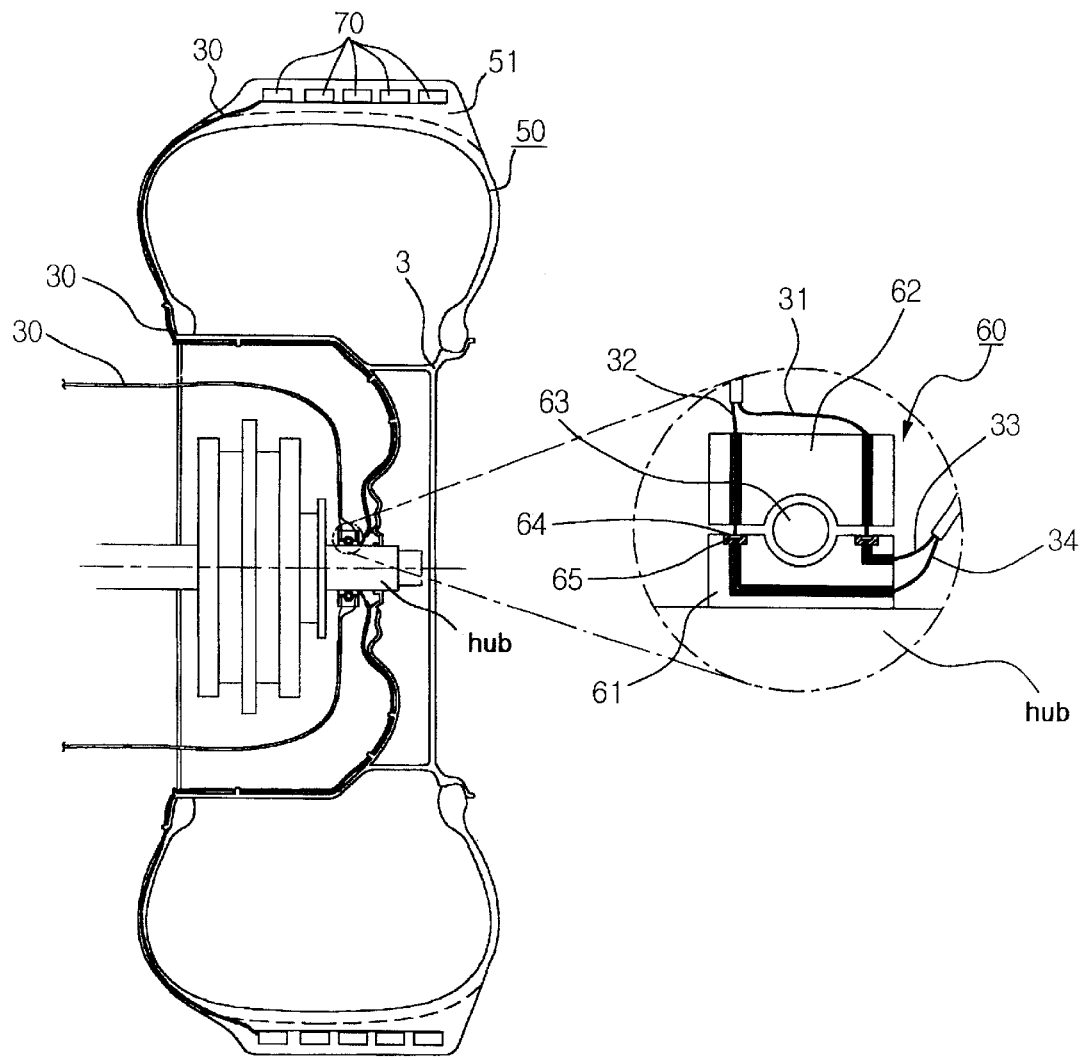
FIG. 11 is a partial sectional view showing an automatically operated antiskid apparatus of a third embodiment in which electric wires are connected to a divided bearing.

FIG. 11 is a partial sectional view showing an automatically operated antiskid apparatus of a third embodiment, in which electric wires are connected to a divided bearing. The construction and operation of the electric wires and the bearing are identical to the construction and operation of the electric wires and the bearing of the FIG. 9.

Figure 12:
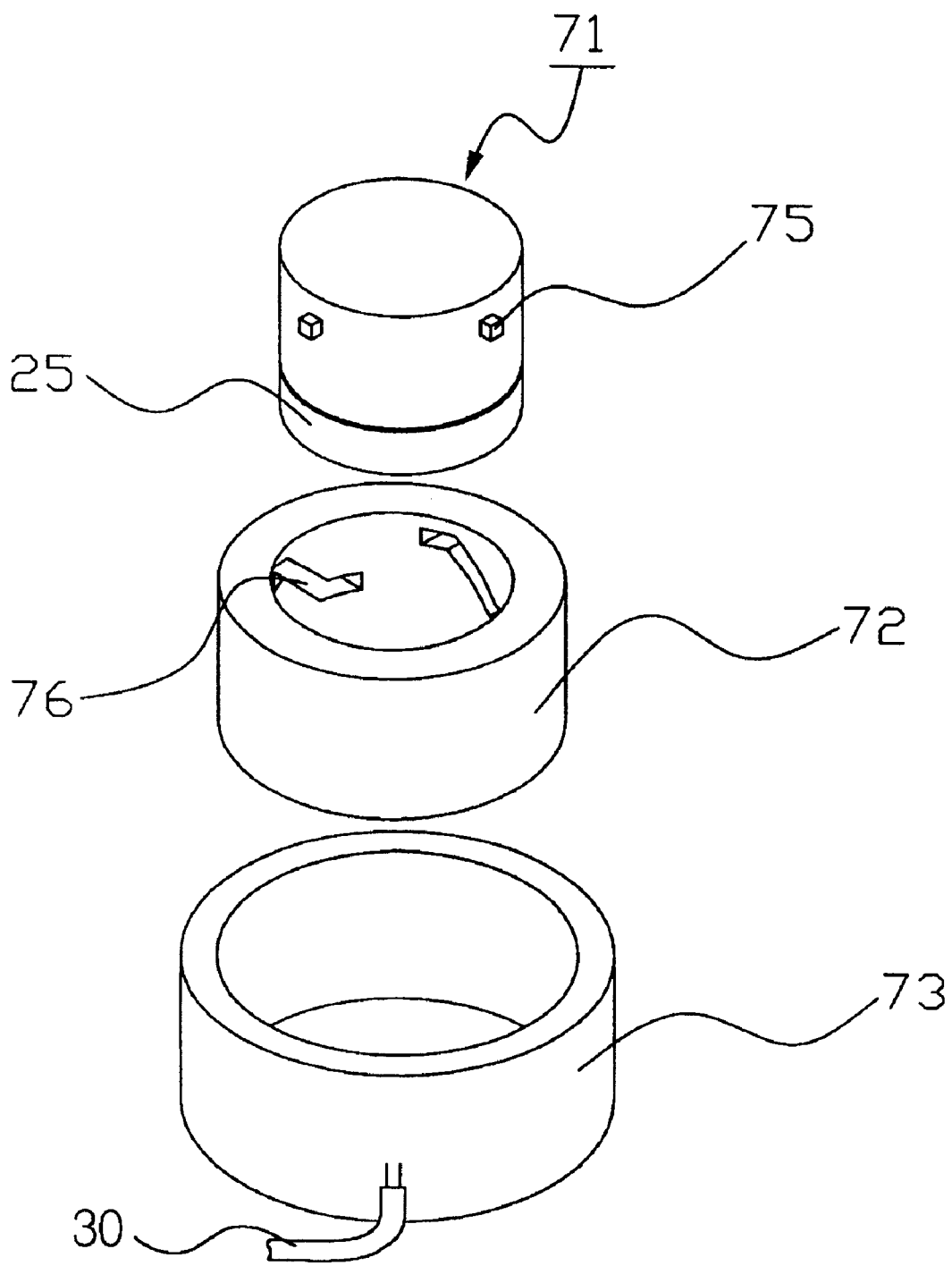
FIG. 12 is an exploded perspective view showing the construction of the electromagnetic type circular antiskid bar unit of the third embodiment.

FIG. 12 is an exploded perspective view showing the electromagnetic type circular antiskid bar unit of the third embodiment, in which a bar part 71 provided at the outer surface thereof with a plurality of projections 75 is situated inside of a guide part 72 provided with a plurality of inclined guide slots 76 and the guide part 72 is situated inside of a casing part 73 through which a coil 74 connected to an electric wire 30 is positioned.

Figure 13:
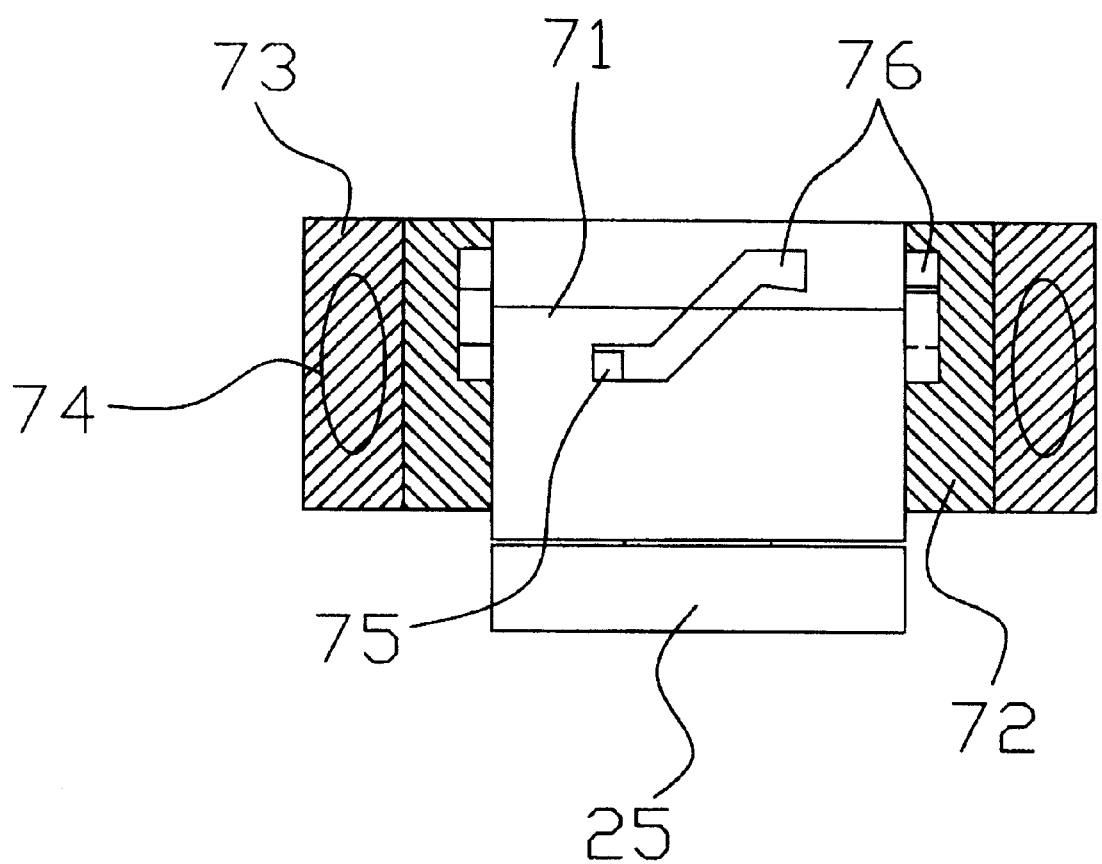
FIG. 13 is a vertical cross-section showing the assembly of the electromagnetic type circular antiskid bar unit of the third embodiment.

FIG. 13 is a vertical cross-section showing the electromagnetic type circular antiskid bar unit of the third embodiment with the projections 75 formed on a bar part 71 inserted into the inclined guide slots 76 formed through the guide part 72.

Figure 14:
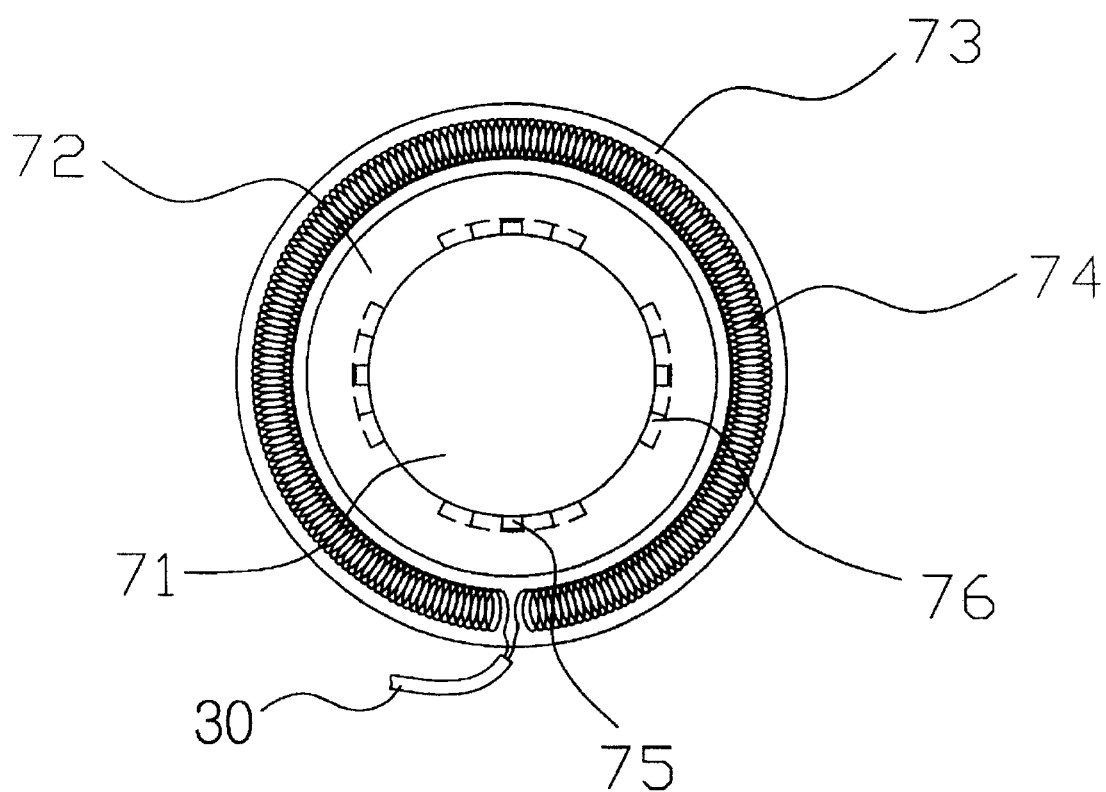
FIG. 14 is a plan view showing the assembly of the electromagnetic type circular antiskid bar unit of the third embodiment.

FIG. 14 is a plan view showing the electromagnetic type circular antiskid bar unit of the third embodiment with the coil 74 contained in the casing part 73 connected to the electric wire 30.

Hereinafter, the automatically operated antiskid apparatus in accordance with embodiments of the present invention is described in detail.

Embodiment 1

In this embodiment, there is disclosed an apparatus for operating antiskid bar units 20 embedded in the tread portions of automobile tires by manipulating a bar operating switch 7 in a hydraulic manner. The automatically operated antiskid apparatus of this embodiment is comprised of a operating signal generating unit, a signal transmitting unit and an antiskid bar and antiskid bar operating unit. The signal generating unit consists of the bar operating switch 7, the booster, the hydraulic cylinder, the hydraulic conduit 2, and a plurality of hydraulic pistons 5. The signal transmitting unit consists of a divided bearing 10. The antiskid bar and antiskid bar operating unit consists of a plurality of steel wire pulling pieces 27, a plurality of steel wires 28 and a plurality of antiskid bar units 20.

The operation of the automatically operated antiskid apparatus in accordance with this embodiment is described hereinafter. As illustrated in FIG. 1, when a driver transmits an operating signal by manipulating the bar operating switch 7 because it is desired to be utilized to operate the antiskid bars for the automobile tires, the booster and the hydraulic cylinder are operated. Hydraulic pressure generated by the booster and the hydraulic cylinder is transmitted to the three pistons 5, and the pistons 5 are moved by the hydraulic pressure. As the pistons 5 are moved, the divided bearing 10 is moved by the pistons 5. The divided bearing 10 pushes the steel wire pulling pieces 27, so the steel wires 28 connected at their first ends to the steel wire pulling piece 27 are pulled. Finally, the antiskid bar units 20 connected to the second ends of the steel wires 28 are operated, and the bar parts 21 are projected from the circumferential surfaces of the automobile tires.

The antiskid bar unit 20 is made by inserting the divided guide part 22, into which the bar part 21 is fitted, into the casing part 23. The bar part 21 is fitted into the divided guide part 22 with the four crosswise projections 29 of the bar part 21 inserted into the four inclined guide slots 26 of the guide parts 22. Two springs 24 are positioned on the side surfaces of the divided guide part 22 to return to their original position, and the two steel wires 28 are connected to the rear portion of the divided guide part 22. The bar part 21 is fitted into the casing part 23 to be vertically moved along the vertical slots formed on the casing part 23.

When the antiskid bars are not desired to be utilized, the bar operating switch 7 is manipulated to retract the bar parts 21 into the tires. Accordingly, hydraulic pressure is reduced by the operation of the booster and the hydraulic cylinder, so the pistons 5 of cylinder-piston units mounted on the knuckle 6 are moved rearward to their original positions. The divided bearing 10 having been pushed by the pistons 5 is returned to its original position by the action of a plurality of spring bars 14. The steel wire pulling pieces 27 having been pulled by the divided bearing 10 are released. As the guide parts 22 are returned to their original positions by the springs 24 positioned in the antiskid bar units 20, the steel wires 28 connected to the guide parts 22 are pulled to return the steel wire pulling pieces 27 to their original positions. Therefore, the antiskid bar units 20 are restored to their original state, and stand by for the projection of antiskid bars.

In addition, the hydraulic pistons 5 and the divided bearing 10 are separated from each other so as to prevent friction from occurring between the hydraulic pistons 5 and the divided bearing 10. The divided bearing 10 is comprised of a left bearing 11, a right bearing 12 and bearing balls 13. When the antiskid bars are utilized, the right bearing 12 of the divided bearing 10 is horizontally movably attached to a plurality of guide portions 4 formed on the inside surface of a wheel rim 3, and can be smoothly and horizontally moved while being rotated by force transmitted from the left bearing 11 in tight contact with the hydraulic piston 5 with the aid of bearing balls 13.

Embodiment 2

In this embodiment, there is disclosed an apparatus for operating electromagnetic type antiskid bar units 40 embedded in automobile tires by manipulating a bar operating switch 7 in an electromagnetic manner. The automatically operated antiskid apparatus of this embodiment is comprised of a operating signal generating unit, a signal transmitting unit and an antiskid bar and antiskid bar operating unit.

The signal generating unit consists of the bar operating switch 7 and a plurality of electric wires 30. The first ends of the electric wires 30 are connected to the bar operating switch 7, while the second ends of the electric wires 30 are connected to the hubs. Each of the electric wires is comprised of a pair of wire strands.

The signal transmitting unit consists of a plurality of divided bearings 60. Each of the divided bearings 60 is comprised of inside and outside bearings 61 and 62 and a plurality of balls 63. The inside bearing 61 is mounted on a hub and provided with two contacts 64 each surrounded with intercepting material 65, while the outside bearing 62 is mounted not to be rotated. The first central terminals 31 and 32 of the wire strands of each electric wire 30 pass through the outside bearing 61 and are brought into contact with the contacts 64 formed on the inside bearing 61, while the second central terminals 33 and 34 of the wire strands of each electric wire 30 pass through the inside bearing 61 and the intercepting material 65 and are connected to the contacts 64 formed on the inside bearing 61. Accordingly, the second central terminals 33 and 34 passing through the inside bearing 61 are rotated together with the tire 50 and the first central terminals 31 and 32 passing through the outside bearing 62 are not rotated, so the wires 30 are not twisted and an operating signal is continuously transmitted by the contacts 64 formed on the inside bearing 61.

There is provided the antiskid bar and antiskid bar operating unit in which the second ends of the electric wires 30 are connected to electromagnets 45 positioned in the casing part 43 of an electromagnetic type antiskid bar unit 40 so that a guide part 42 is moved to project a bar part 41 by moving permanent magnets 45 attached to the side protrusions of the guide part 42.

The electromagnetic type antiskid bar unit 40 is comprised of the T-shaped, hollow casing part 43 made of flexible, thin material and provided in its interior with four fixed electromagnets 44 and two vertical guide slots, the guide part 42 provided with a plurality of inclined guide slots and at its both sides with two permanent magnets 45, and the bar part 41 provided with a plurality of projections and situated between two members of the guide part 42 with the projections inserted into the inclined guide slots of the guide part 42. The bar part 41 can be vertically moved along vertical guide slots formed in the casing part 42.

When bar parts 41 having been projected from the tread portions of the tires are not desired to be utilized, the bar operating switch 7 is manipulated to retract the bar parts 41 into the tread portions of the tires. Accordingly, an operating signal for retracting the antiskid bars is transmitted to the antiskid bar and antiskid bar operating units through the wires 30 and the signal transmitting unit. The magnetic poles of the four electromagnets 44 formed on the antiskid bar units 40 are changed, so the guide parts 42 and the bar part 41 are returned to their original states.

Therefore, the electromagnetic antiskid bar units 40 are restored to their original state, and stand by for the projection of bar parts.

Embodiment 3

In this embodiment, there is disclosed an apparatus for operating antiskid block units 70 embedded in automobile tires by manipulating a block operating switch 7 using coils. The automatically operated antiskid apparatus of this embodiment is comprised of a operating signal generating unit, a signal transmitting unit and an antiskid block and antiskid block operating unit. The signal generating unit consists of the block operating switch 7 and electric wires 30. Each of the electric wires is comprised of a pair of wire strands.

The signal transmitting unit consists of a plurality of divided bearings 60. Each of the divided bearings 60 is comprised of inside and outside bearings 61 and 62 and a plurality of balls 63. The inside bearing 61 is mounted on a hub and provided with two contacts 64 each surrounded with intercepting material 65, while the outside bearing 62 is mounted not to be rotated. The first central terminals 31 and 32 of the wire strands of each electric wire pass through the outside bearing 61 and are brought into contact with the contacts 64 formed on the inside bearing 61, while the second central terminals 33 and 34 of the wire strands of each electric wire pass through the inside bearing 61 and the intercepting material 65 and are connected to the contacts 64 formed on the inside bearing 61. Accordingly, the second terminals 33 and 34 passing through the inside bearing 61 are rotated together with the tire 50 and the first terminals 31 and 32 passing through the outside bearing 62 are not rotated, so the wires 30 are not twisted and an operating signal is continuously transmitted by the contacts 64 formed on the inside bearing 61.

There is provided the antiskid block and antiskid block operating unit in which the second ends of the electric wires 30 are connected to coils 74 positioned in the casing parts 73 of electromagnetic type circular antiskid block units 70 embedded in the tread portions 51 of tires so that the block parts 71 of the electromagnetic type circular antiskid block units 70 are rotated by utilizing the principle of an electromagnet.

Each of the electromagnetic circular antiskid block units 70 is comprised of the cylindrical casing part 73 which is made of rubber and in which a coil 74 is situated, the cylindrical guide part 72 positioned inside of the casing part 73 and provided with a plurality of inclined guide slots 76, and the block part 71 positioned inside of the guide part 72 and provided at its outside surface with a plurality of projections 75 inserted into the guide slots 76.

When the block parts 71 having been projected from the tread portions of the automobile tires are not desired to be utilized, the block operating switch 7 is manipulated to retract the block parts 71 into the tread portions of the automobile tires. Accordingly, an operating signal for projecting the block parts 71 is transmitted to the antiskid block and antiskid block operating unit through the wire 30 and the signal transmitting unit. The block parts 71 are reversely rotated by the coils 74 contained in the casing parts 73. Therefore, the electromagnetic type circular antiskid block units 20 are restored to their original state, and stand by for the projection of the block parts.

A plurality of bolts 25 attached to the bar parts 21 and 41 and the block parts 71 are mounted to be easily replaced by new ones.

As described above, the present invention provides an automatically operated antiskid apparatus for automobile tires, which allows a driver to project the antiskid bars from the tread portions of the automobile tires and retract the antiskid bars into the tires by manipulating a bar operating switch without getting out of the automobile, and which allows worn antiskid bars to be easily repaired by replacing bolts, thereby improving the convenience of a driver and contributing to safe driving.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatically operated antiskid apparatus for automobile tires, comprising:
    an operating signal generating unit for transmitting an operation signal generated by a bar operating switch to positions in the vicinity of automotive wheels;
    a signal transmitting unit for receiving the operating signal from said operating signal generating unit and transmitting the operating signal from a stationary automobile body to rotating wheel rims; and
    an antiskid bar and antiskid bar operating unit receiving the operating signal from said signal transmitting unit and operating antiskid bars embedded in tread portions of the tires; wherein
        said operating signal generating unit includes the bar operating switch,
        a booster connected to said bar operating switch for amplifying the operating signal,
        a hydraulic cylinder connected to said booster for transmitting an amplified operating signal, a hydraulic conduit connected to said hydraulic cylinder for transmitting the amplified signal, and
        a plurality of hydraulic pistons connected to said hydraulic conduit and mounted on knuckles situated in automobile wheels;
        said signal transmitting unit includes a plurality of divided bearings each attached to a plurality of guide portions formed on inside surfaces of wheel rims, each of said divided bearings being composed of left and right disks and bearing balls between right and left disks;
        said antiskid bar and antiskid bar operating unit includes,
            a plurality of steel wire pulling pieces each situated outside of each divided bearing,
            a plurality of steel wires first ends of which are connected to said steel wire pulling pieces, and
            a plurality of antiskid bar units connected to second ends of said steel wires and positioned in tread portions of said tires; and
        each of said antiskid bar units includes,
            a T-shaped, hollow casing part made of flexible, thin material and provided with a plurality of vertical guide slots,
            a guide part provided with a plurality of inclined guide slots and at its both sides with one or more springs, and
            a bar part provided with a plurality of projections and situated between two members of the guide part with the projections inserted into the inclined slots of the guide part.

2. An automatically operated antiskid apparatus for automobile tires, comprising:
    an operating signal generating unit for transmitting an operation signal generated by a bar operating switch to positions in the vicinity of automotive wheels;
    a signal transmitting unit for receiving the operating signal from said operating signal generating unit and transmitting the operating signal from a stationary automobile body to rotating wheel rims; and
    an antiskid bar and antiskid bar operating unit receiving the operating signal from said signal transmitting unit and operating antiskid bars embedded in tread portions of the tires; wherein
        said operating signal generating unit includes the bar operating switch, and
        a plurality of electric wires first ends of which are connected to said bar operating switch and second ends of which are connected to hubs of the wheels, each of said electric wires being comprised of a pair of wire strands;
        said signal transmitting unit includes a plurality of divided bearings, each of said divided bearings being comprised of inside and outside bearings and a plurality of balls, said inside bearing being mounted on the corresponding hub and provided with two contacts each surrounded with intercepting material, said outside bearing being mounted not to be rotated, first central terminals of said wire strands of each electric wire passing through said outside bearing and being brought into contact with said contacts formed on said inside bearing, second central terminals of the wire strands of each electric wire passing through the inside bearing and said intercepting material and being connected to the contacts formed on the inside bearing;
        said antiskid bar and antiskid bar operating unit in which second ends of the electric wires are connected to electromagnets positioned in the casing parts of a plurality of electromagnetic antiskid bar units so that guide parts are moved to project bar parts by moving permanent magnets attached to the side protrusions of the guide parts; and
        each of said electromagnetic antiskid bar units includes,
            a T-shaped, hollow casing part made of flexible, thin material and provided in its interior with four fixed electromagnets and a plurality of vertical guide slots, the guide part provided with a plurality of inclined guide slots and at its both sides with two permanent magnets, and
            the bar part provided with a plurality of projections and situated between two members of the guide part with the projections inserted into the inclined slots of the guide part.

3. An automatically operated antiskid apparatus for automobile tires, comprising:
    an operating signal generating unit for transmitting an operation signal generated by a bar operating switch to positions in the vicinity of automotive wheels;
    a signal transmitting unit for receiving the operating signal from said operating signal generating unit and transmitting the operating signal from a stationary automobile body to rotating wheel rims; and
    an antiskid bar and antiskid bar operating unit receiving the operating signal from said signal transmitting unit and operating antiskid bars embedded in tread portions of the tires; wherein said operating signal generating unit includes the block operating switch, and a plurality of electric wires first ends of each of which are connected to said block operating switch and second ends of each of which are connected to hubs of the wheels, each of said electric wires being comprised of a pair of wire strands;

said signal transmitting unit includes a plurality of divided bearings, each of said divided bearings being comprised of inside and outside bearings and a plurality of balls, said inside bearing being mounted on the corresponding hub and provided with two contacts each surrounded with intercepting material, said outside bearing being mounted not to be rotated, first central terminals of said wire strands of each electric wire passing through said outside bearing and being brought into contact with said contacts formed on said inside bearing, second central terminals of the wire strands passing through the inside bearing and said intercepting material and being connected to the contacts formed on the inside bearing;

said antiskid block and antiskid block operating unit in which the second ends of the electric wires are connected to coils positioned in casing parts of electromagnetic circular antiskid block units embedded in the tread portions of tires so that guide parts are moved to project block parts by moving permanent magnets attached to side protrusions of said guide part; and each of said electromagnetic circular antiskid block units includes the cylindrical casing part which is made of rubber and in which the coil, to which said wire is connected, is situated, the cylindrical guide part positioned inside of the casing part and provided with a plurality of inclined guide slots, and the block part positioned inside of the guide part and provided at its outside surface with a plurality of projections inserted into the guide slots.

\* \* \* \* \*